O. S. JENNINGS.
MECHANICAL RECTIFIER AND MEANS FOR IMPROVING THE OPERATION OF THE SAME.
APPLICATION FILED MAR. 2, 1917.
1,336,564.
Patented Apr. 13, 1920.
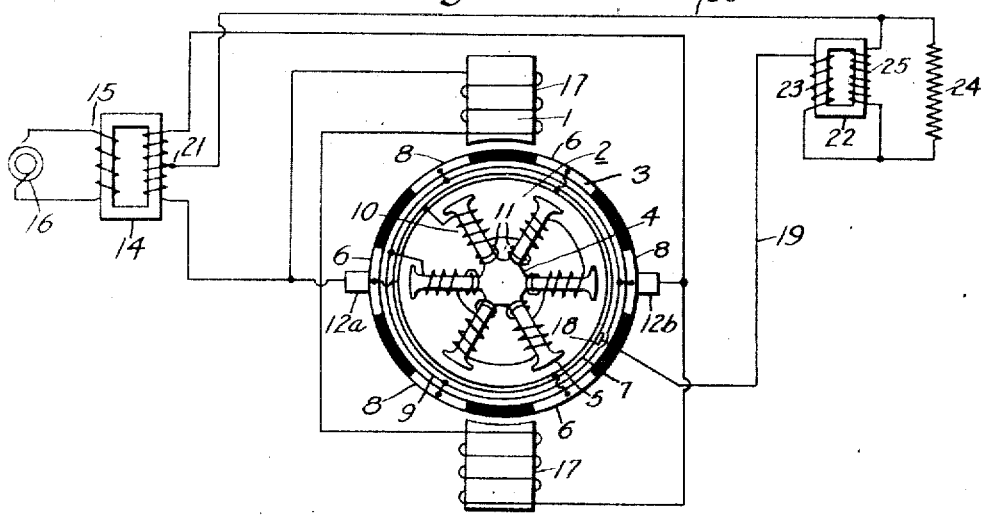
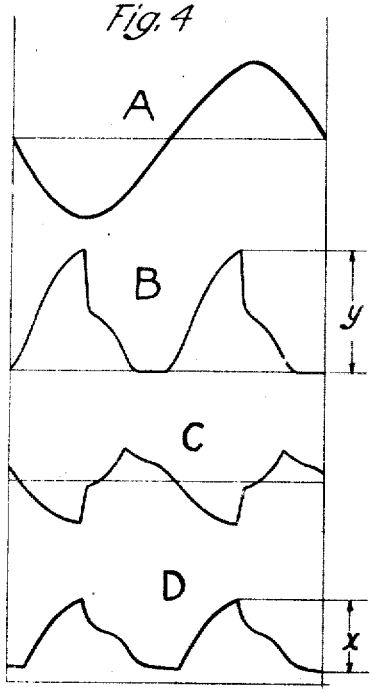
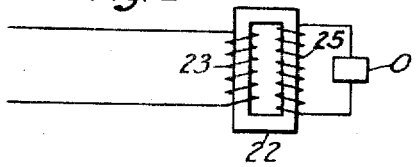
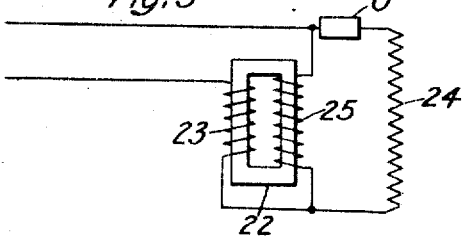
WITNESSES:
Fred. C. Wilharm
O. W. Kennedy
INVENTOR
Oliver S. Jennings
BY
Wesley G. Carr
ATTORNEY

UNITED STATES PATENT OFFICE.

OLIVER S. JENNINGS, OF WILKINSBURG, PENNSYLVANIA, ASSIGNOR TO WESTINGHOUSE ELECTRIC AND MANUFACTURING COMPANY, A CORPORATION OF PENNSYLVANIA.

MECHANICAL RECTIFIER AND MEANS FOR IMPROVING THE OPERATION OF THE SAME.

1,336,564.

Specification of Letters Patent.　　Patented Apr. 13, 1920.

Application filed March 2, 1917. Serial No. 151,979.

*To all whom it may concern:*

Be it known that I, OLIVER S. JENNINGS, a citizen of the United States, and a resident of Wilkinsburg, in the county of Allegheny and State of Pennsylvania, have invented a new and useful Improvement in Mechanical Rectifiers and Means for Improving the Operation of the same, of which the following is a specification.

My invention relates to mechanical rectifiers of the commutator type, and it has for its object to provide a mechanical rectifier that shall be both self-starting and self-synchronizing.

Another object of my invention is to provide means for so altering the form and characteristics of the pulsating current wave produced by the rectifier as to reduce the percentage of periodic variation occurring therein.

Mechanical rectifiers of the commutator type, as heretofore constructed, have usually comprised a commutator cylinder operatively connected to a driving motor that rotates the commutator cylinder substantially in synchronism with the frequency of the alternating-current supply. With such a device, difficulties have arisen in starting and in maintaining the commutator cylinder at synchronous speed.

According to my invention, I provide a mechanical rectifier comprising a rotatable armature member provided with a commutator cylinder and windings so connected thereto that the device is not only self-starting but is adapted to operate continuously at substantially synchronous speed.

It is well known that rectifying devices of the above-described type produce a rather peaked rectified current wave having a relatively high percentage of periodic variation. I propose to cut down the pulsations in the rectified wave and to prevent the occurrence of zero voltage by connecting a corrective device in the receiving circuit.

In the accompanying drawings, Figure 1 is a diagrammatic view of the arrangement and circuit connections of a rectifier constructed in accordance with my invention; Figs. 2 and 3 are diagrammatic views respectively showing the circuit connections of corrective devices that are employed to improve the wave forms of apparatus embodying my invention, and Fig. 4 is a diagrammatic showing of the wave-forms obtained under various conditions.

The rectifier comprises a stationary field magnet 1, and a rotatably mounted armature 2 which comprises a commutator cylinder 3 and a magnetizable core member 4. The armature core member 4 is provided with radial projections 5 that are spaced approximately 60° apart. Three conducting segments 6 of the commutator cylinder 3 that are spaced 120° apart are connected to a slip ring 7 and three other segments 8 that are intermediate the bars 6 are also spaced 120° apart and are connected together by a ring 9. The projections 5 of the armature core 4 are provided with exciting coils 10 which are connected in series relation between the collector ring 7 and the connecting ring 9 and are arranged to produce alternate poles upon the core member 4. The projections 5 are further provided with auxiliary coils 11 which are closed upon themselves and are preferably of large cross-sectional area, as compared with the exciting coils 10.

Diametrically disposed brushes 12ª and 12ᵇ coact with the commutator cylinder 3 and are connected to the terminals of the secondary winding 13 of a supply transformer 14, the primary winding 15 of which is connected to a suitable source of alternating current, such, as a single-phase generator 16. The pole pieces 1 are provided with field-magnet windings 17 that are connected across the secondary winding 13 and are arranged to produce opposite poles. A brush 18 coacts with the collector ring 7 and is connected to one main 19 of a receiving circuit, the other main 20 of which is connected to the middle point 21 of the secondary winding 13. A transformer 22 is connected in the receiving circuit, with its primary winding 23 in series-circuit relation with a resistance load 24, which may be a storage battery or some other translating device. The secondary winding 25 of the transformer 22 is connected between the mains 19 and 20, so that the induced voltage of the transformer 22 is impressed directly across the load 24.

Having described the various parts entering into my invention, the operation is as follows. When the main field-magnet windings 17 and the exciting coils 10 are simultaneously excited from the secondary winding 13, the rectifier will start as a shunt motor, and since the torque will be increased by the effect of the coils 11 and there will be no load upon the armature, its speed will increase rapidly. As the speed of the armature 2 approaches synchronism, the current flowing through the coils 10 tends to become unidirectional and to establish substantially fixed poles on the core member 4. At synchronous speed, fixed poles are established on the core member and the machine will then operate and develop considerable torque as a synchronous motor. If the speed of the armature tends to exceed or fall below synchronism under a varying load, the damping effect of the short-circuited coils 11 will oppose this "hunting" action and tend to maintain the armature in synchronism. At synchronous speed, an alternating-current wave of one polarity will flow during one-half of a cycle from the brush 12ᵃ to the slip ring 7. The current divides at the slip ring 7, a portion traversing the direct-current mains 19 and 20 and the load 24 and from thence back to the neutral point 21 of the winding 13 and the remaining portion traversing the exciting windings 10, the connecting ring 9 and the brush 12ᵇ and from thence back to the other terminal of the winding 13. As the polar projections 5 are spaced 60° apart, it will be readily understood that the armature will turn through 60° during each half cycle. Consequently, an alternating-current wave of the opposite polarity will flow during the other half cycle from the brush 12ᵇ to the slip ring 7 from whence it divides, as described above, so that the flow of current through the direct-current mains 19 and 20.and through the exciting coils 10 is always in the same direction.

From the foregoing, it is apparent that a mechanical rectifier constructed in accordance with my invention will start and come into synchronism with the frequency of the alternating-current supply without the aid of any auxiliary starting devices and that it will continue to operate at substantially synchronous speed.

Referring to Fig. 4, the wave form of the alternating-current supply voltage is shown at A and the wave form of the rectified current is shown at B. With the transformer 22 connected as shown in Fig. 2 and with an oscillograph O connected directly across the terminals of the secondary winding 25, the wave form of the induced voltage, as determined from the oscillograph O, is shown at C, it being noted that this wave has double frequency of the wave A. With the oscillograph O connected as shown in Fig. 3, the final wave-form of the rectified current passing through the direct-current load 24 is shown at D. An inspection of the curves reveals the fact that the curve D may be approximately produced by superimposing the curve C upon the curve B. This is substantially what occurs when the induced voltage of the transformer 22 is impressed across the receiving circuit. It is obvious, from a comparison of curves B and D, that the peaks in the wave of rectified current are materially reduced and that the occurrence of zero voltage is eliminated by the use of my corrective device. The degree of corrective effect obtained is substantially represented by the ratio between the dimensions $x$ and $y$ which graphically represent the percentages of periodic variation in the rectified waves with and without my corrective device, respectively.

While I have shown my rectifier in a simple and preferred form, it is not so limited and it is also apparent that my corrective device may be equally as well applied to other types of rectifying apparatus such, for example, as vapor converters that produce a pulsating current in which is desired to reduce the percentage of periodic variation. I desire, therefore, that only such limitations shall be placed thereupon as are imposed by the prior art or are specifically set forth in the appended claims.

I claim as my invention:

1. In a mechanical rectifying system, a rectifying commutator, a driving motor therefor, comprising rotor and stator windings, and means connecting said commutator to said windings whereby the motor starts as a single-phase shunt commutator motor and whereby, during rectifying operation, said rotor winding is supplied with unidirectional current and said motor operates as a synchronous motor.

2. In a mechanical rectifying system, a rectifying commutator, a driving motor therefor, comprising rotor and stator windings, means connecting said commutator to said windings whereby the motor starts as a single-phase shunt commutator motor and whereby, during rectifying operation, said rotor winding is supplied with unidirectional current and said motor operates as a synchronous motor, and means for causing said motor to operate partially as a single-phase induction motor during the acceleration period thereof.

3. In a mechanical rectifying system, a rectifying commutator, a driving motor therefor embodying means for starting as a single-phase shunt commutator motor, for subsequently operating partially as a single-phase commutator motor and partially as a single-phase induction motor, and for finally operating as a synchronous motor, the connections of said motor remaining unchanged during the entire operating range.

4. In a rectifying system, the combination with a source of alternating current, of a driving motor embodying stator and rotor members respectively provided with windings, a rectifying commutator mounted to be driven by said motor, connections whereby said stator winding is energized with alternating current and further connections whereby said rotor winding is supplied with direct current of the full voltage of said source during synchronous operation.

5. In a rectifying system, the combination with a source of alternating current, of a driving motor comprising rotor and stator members respectively provided with windings, a rectifying commutator arranged to be driven by said motor and embodying a moving element carrying $n$ conducting segments and two fixed brushes arranged to bear upon said segments at points $\frac{m}{n} 360°$ apart, $m$ and $n$ being positive integers, $m$ being odd and $n$ being even, connections from said source to said brushes, means for connecting alternate segments into one group, means for connecting the remaining segments into another group, means permanently connecting said rotor winding between said two segment-groups, and means connecting one of said segment-groups to an intermediate point in said source through a load.

6. In a rectifying system, the combination with a source of alternating current, of a driving motor comprising rotor and stator members respectively provided with windings, a rectifying commutator arranged to be driven by said motor and embodying a moving element carrying $n$ conducting segments and two fixed brushes arranged to bear upon said segments at points $\frac{m}{n} 360°$ apart, $m$ and $n$ being positive integers, $m$ being odd and $n$ being even, connections from said source to said brushes, means for connecting alternate segments into one group, means for connecting the remaining segments into another group, means permanently connecting one of said windings between said two segment groups, means connecting one of said segment groups to an intermediate point in said source through a load, and means for connecting the remaining winding across said source of alternating current.

7. In a rectifying system, the combination with a source of alternating current, of a driving motor comprising rotor and stator members respectively provided with windings, a rectifying commutator arranged to be driven by said motor and embodying a moving element carrying $n$ conducting segments and two fixed brushes arranged to bear upon said segments at points $\frac{m}{n} 360°$ apart $m$ and $n$ being positive integers, $m$ being odd and $n$ being even, connections from said source to said brushes, means for connecting alternate segments into one group, means for connecting the remaining segments into another group, means permanently connecting said rotor winding between said two segment-groups, means connecting one of said segment-groups to an intermediate point in said source through a load, and a closed winding on said rotor member.

In testimony whereof, I have hereunto subscribed my name this 27th day of Feb., 1917.

OLIVER S. JENNINGS.